(12) United States Patent
Cardoso de Moura et al.

(10) Patent No.: US 9,769,614 B2
(45) Date of Patent: Sep. 19, 2017

(54) METHOD AND SYSTEM FOR PROVIDING GPS DATA CORRECTIONS TO MOBILE NODES IN A NETWORK OF MOVING THINGS

(71) Applicant: Veniam, Inc., Mountain View, CA (US)

(72) Inventors: Daniel Cardoso de Moura, Vila Nova de Gaia (PT); Nuno Alexandre Tavares Coutinho, Porto (PT); Roy Russell, Cambridge, MA (US)

(73) Assignee: Veniam, Inc., Mountain View, CA (US)

( * ) Notice: Subject to any disclaimer, the term of this patent is extended or adjusted under 35 U.S.C. 154(b) by 0 days.

(21) Appl. No.: 15/458,096

(22) Filed: Mar. 14, 2017

(65) Prior Publication Data

US 2017/0188195 A1    Jun. 29, 2017

Related U.S. Application Data

(63) Continuation of application No. 15/244,394, filed on Aug. 23, 2016, now Pat. No. 9,596,570.

(60) Provisional application No. 62/244,930, filed on Oct. 22, 2015.

(51) Int. Cl.
*H04W 4/00* (2009.01)
*H04W 4/02* (2009.01)
*H04L 29/08* (2006.01)
*G01S 19/07* (2010.01)
*H04W 88/10* (2009.01)

(52) U.S. Cl.
CPC ............. *H04W 4/023* (2013.01); *G01S 19/07* (2013.01); *H04L 67/10* (2013.01); *H04W 88/10* (2013.01)

(58) Field of Classification Search
None
See application file for complete search history.

(56) References Cited

U.S. PATENT DOCUMENTS

2012/0295641 A1* 11/2012 Tsuda ................. H04B 7/18547
                                                              455/456.6

\* cited by examiner

*Primary Examiner* — Suhail Khan
(74) *Attorney, Agent, or Firm* — McAndrews, Held & Malloy, Ltd.

(57) ABSTRACT

Systems and methods are described that use anchors to correct satellite-based geographic positioning data in a network of moving things. A plurality of anchor nodes using low-cost, non-differential GPS capable receiver may be used to correct positioning information of a plurality of other nodes of a network of moving things. Nodes in the network may share correction information produced by the anchor nodes with neighboring nodes, enabling other nodes of the network to correct positioning information produced by their own receivers of satellite-based geo-positioning information.

27 Claims, 13 Drawing Sheets

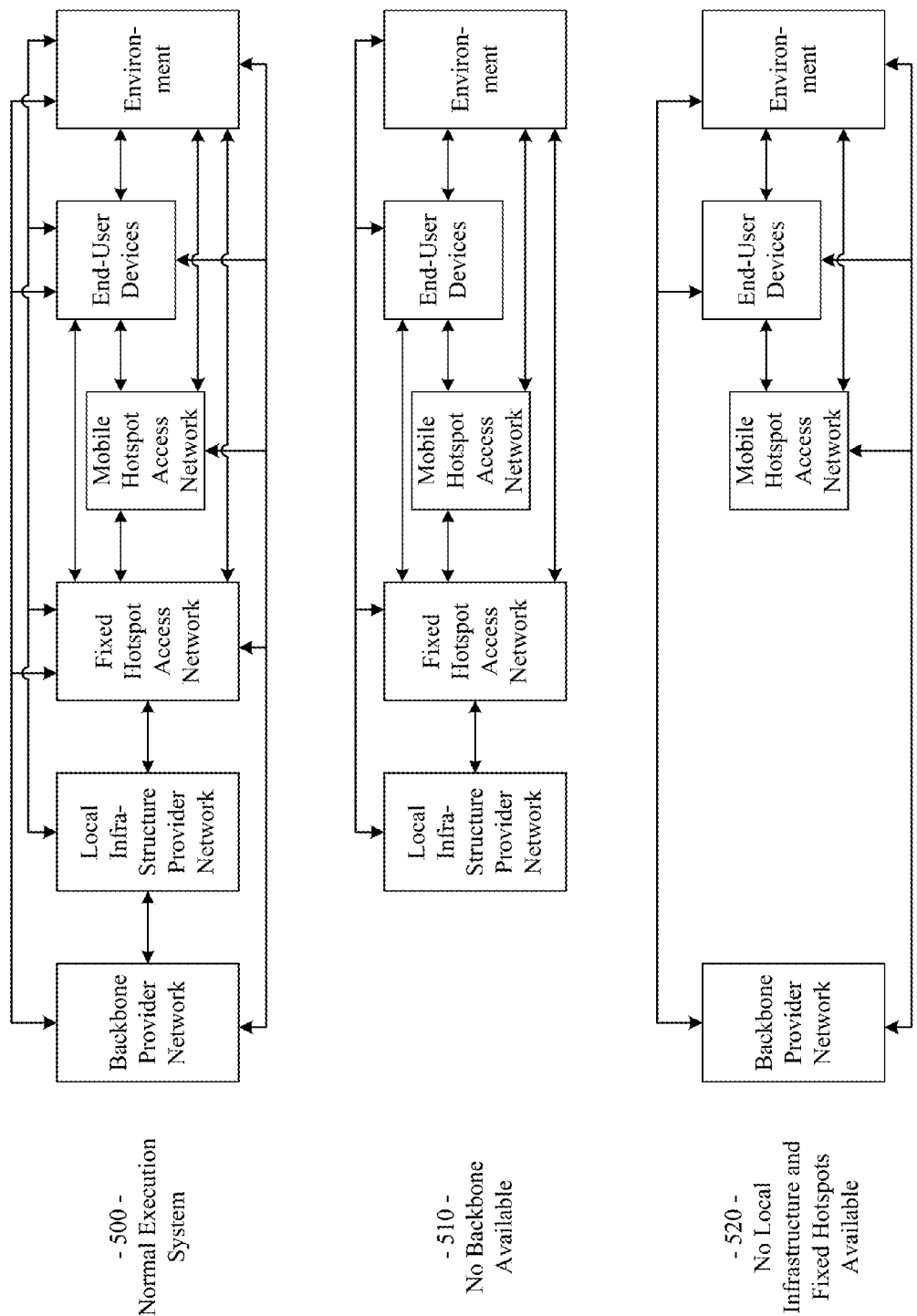

| ANCHOR ID 910 | ANCHOR TIME 912 | SAT A 914 | SAT B 916 | SAT C 918 | SAT D 920 | *** | LAT ERR 922 | LON ERR 924 | ALT ERR 926 |
|---|---|---|---|---|---|---|---|---|---|

METHOD AND SYSTEM FOR PROVIDING GPS DATA CORRECTIONS TO MOBILE NODES IN A NETWORK OF MOVING THINGS

CROSS-REFERENCE TO RELATED APPLICATIONS/INCORPORATION BY REFERENCE

This patent application is a continuation of U.S. patent application Ser. No. 15/244,394, filed on Aug. 23, 2016, and titled "Using Anchors to Correct GPS Data in a Network of Moving Things," which issued as U.S. Pat. No. 9,596,570 on Mar. 14, 2017, and which makes reference to, claims priority to, and claims benefit from U.S. Provisional Patent Application Ser. No. 62/244,930, filed on Oct. 22, 2015, and titled "Using Anchors to Correct GPS Data in a Network of Moving Things," each of which is hereby incorporated herein by reference in its respective entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/222,192, titled "Communication Network of Moving Things," filed on Sep. 22, 2015; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," filed on Jan. 14, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Current communication networks are unable to adequately support communication environments involving moving networks. As a non-limiting example, current communication networks are unable to adequately support a network comprising a complex array of both moving and static nodes, some of which may be network access points (e.g., the Internet of moving things) interacting with sensor systems. Limitations and disadvantages of conventional methods and systems will become apparent to one of skill in the art, through comparison of such approaches with some aspects of the present methods and systems set forth in the remainder of this disclosure with reference to the drawings.

BRIEF DESCRIPTION OF SEVERAL VIEWS OF THE DRAWINGS

FIGS. 5A-5C illustrate network flexibility by providing example modes (or configurations), in accordance with various aspects of this disclosure.

FIG. 9 shows the information elements of an example correction vector, in accordance with various aspects of the present disclosure.

SUMMARY

Figure 1:
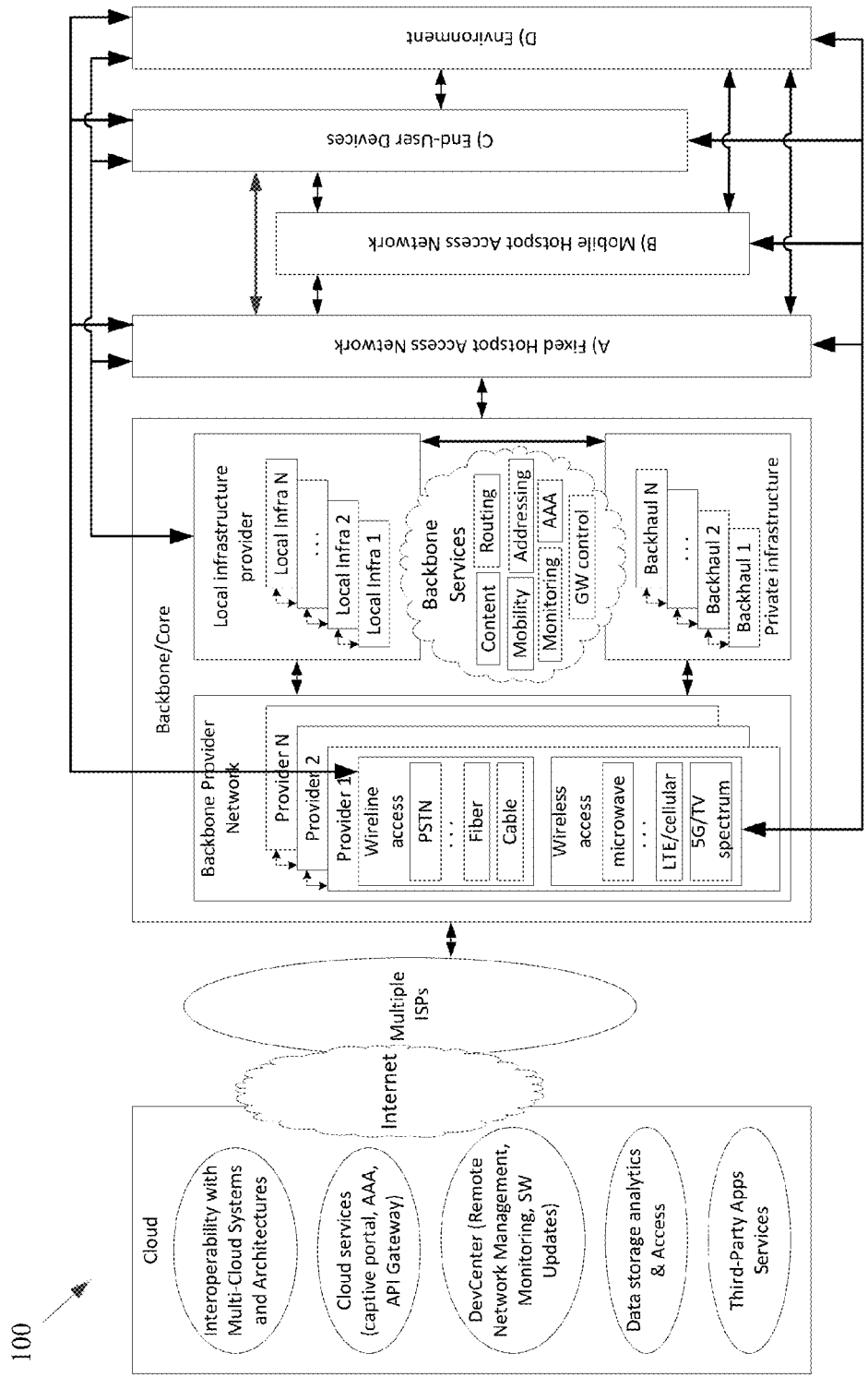
FIG. 1 shows a block diagram of a communication network, in accordance with various aspects of this disclosure.

Various aspects of this disclosure provide systems and methods for enhancing operation of entities in a network of moving things. As non-limiting examples, various aspects of this disclosure provide systems and methods for using anchors to correct GPS data in a network of moving things.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner. The present disclosure also provides various aspects of systems and method for self-initialization an automated bootstrapping of network elements of such a network of moving things.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, etc.) as Wi-Fi hotspots. Note that Wi-Fi is generally used throughout this discussion as an example, but the scope of various aspects of this disclosure is not limited thereto. For example, other wireless Local Area Network (LAN) technologies, Personal Area Network (PAN) technologies, Metropolitan Area Network (MAN) technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for Subscriber Identity Module (SIM) cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and CO2 emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, NO2, O3, volatile organic compounds (or VOCs), CO2, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles. Such sensors may, for example, comprise positioning sensors (e.g., GPS sensors, Galileo sensors, GLONASS sensors, etc.). Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and CO2 emissions of the vehicles, the communication network allows a port operator to improve the coordination of the ship loading processes and increase the throughput of the harbor. Also for example, the communication network enables remote monitoring of drivers' behaviors, trucks' positions and engines' status, and then be able to provide real-time notifications to drivers (e.g., to turn on/off the engine, follow the right route inside the harbor, take a break, etc.), thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
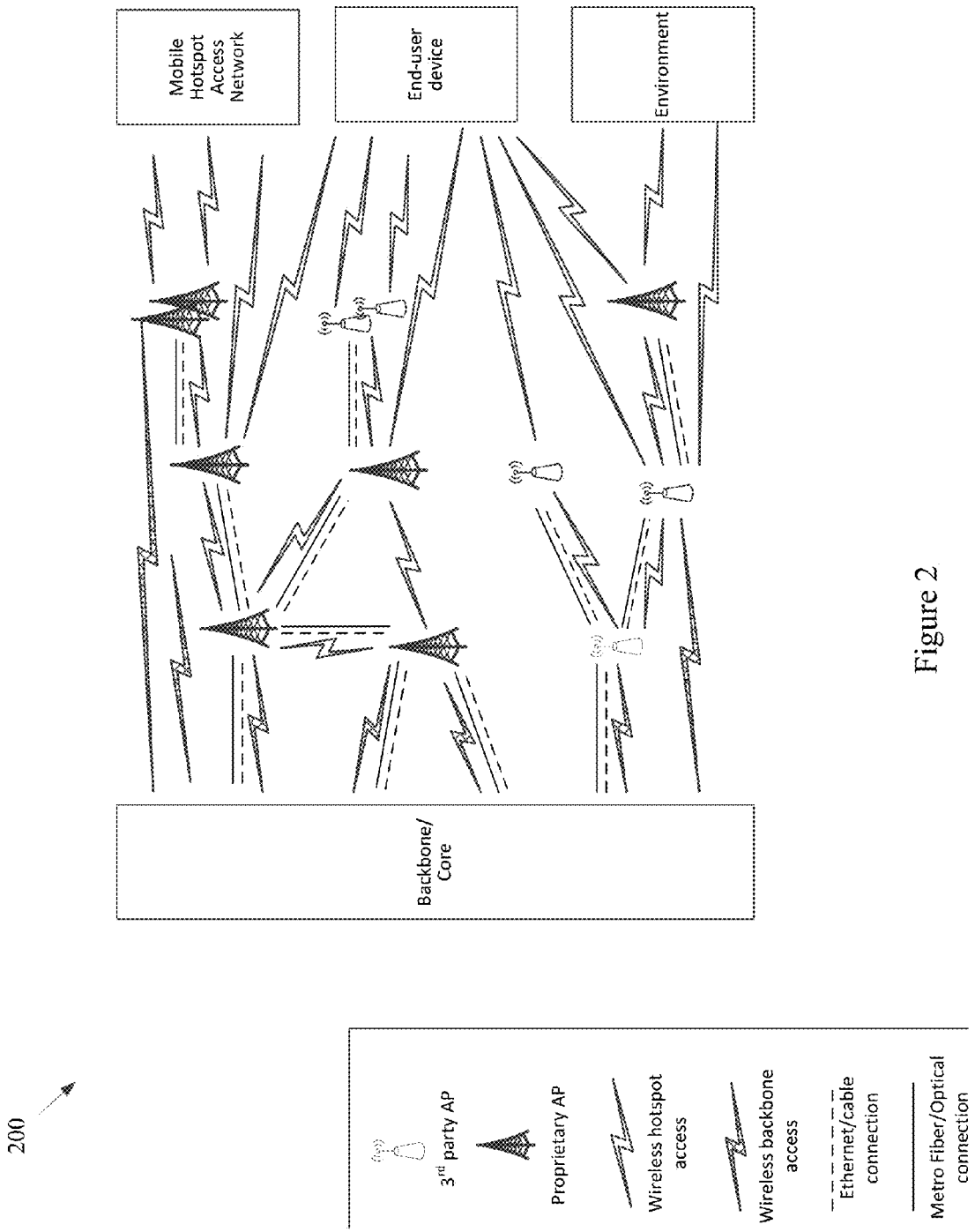
FIG. 2 shows various example characteristics of a Fixed Hotspot Access Network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
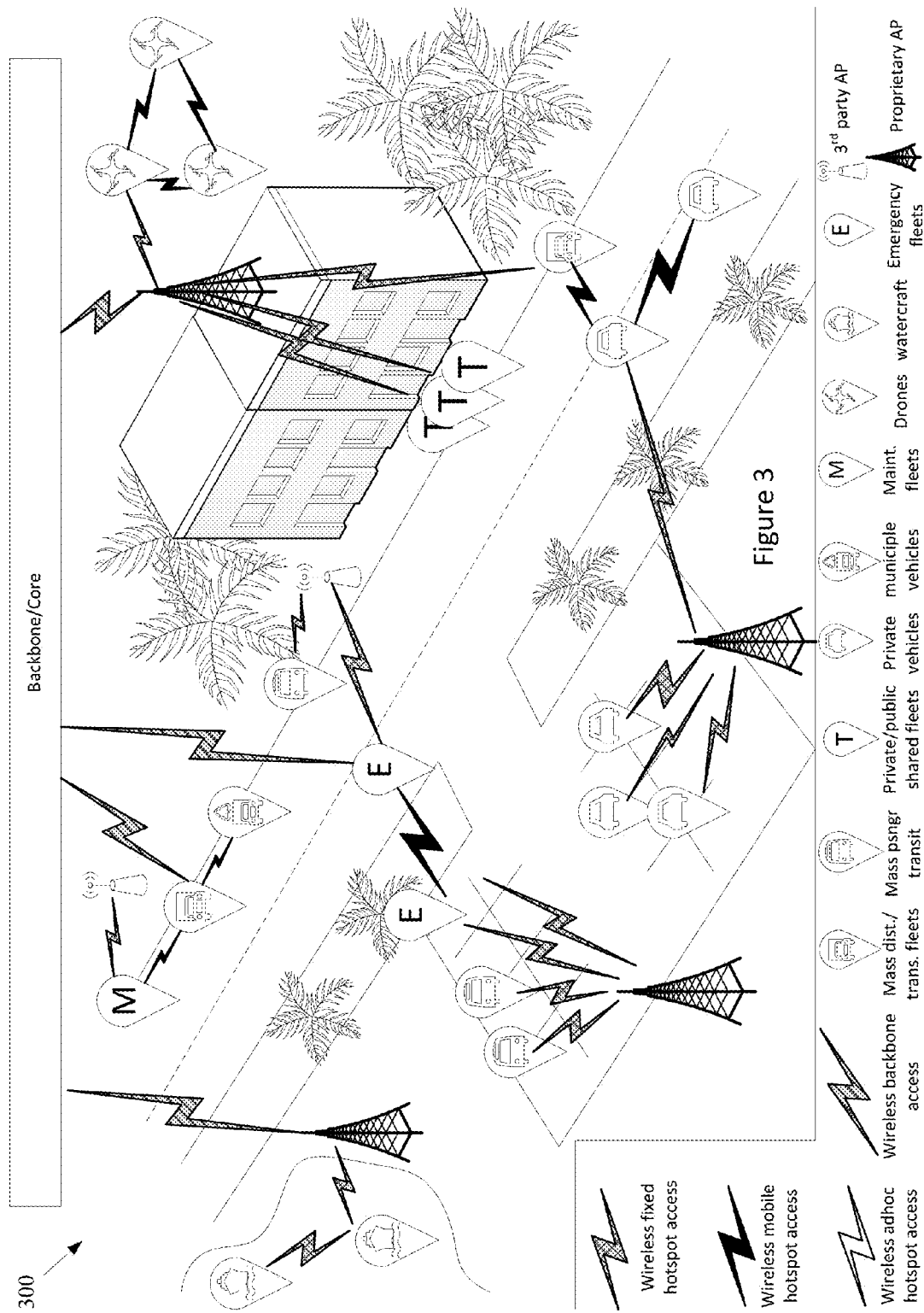
FIG. 3 shows various example characteristics of a Mobile Hotspot Access Network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, and 600 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speed-boats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
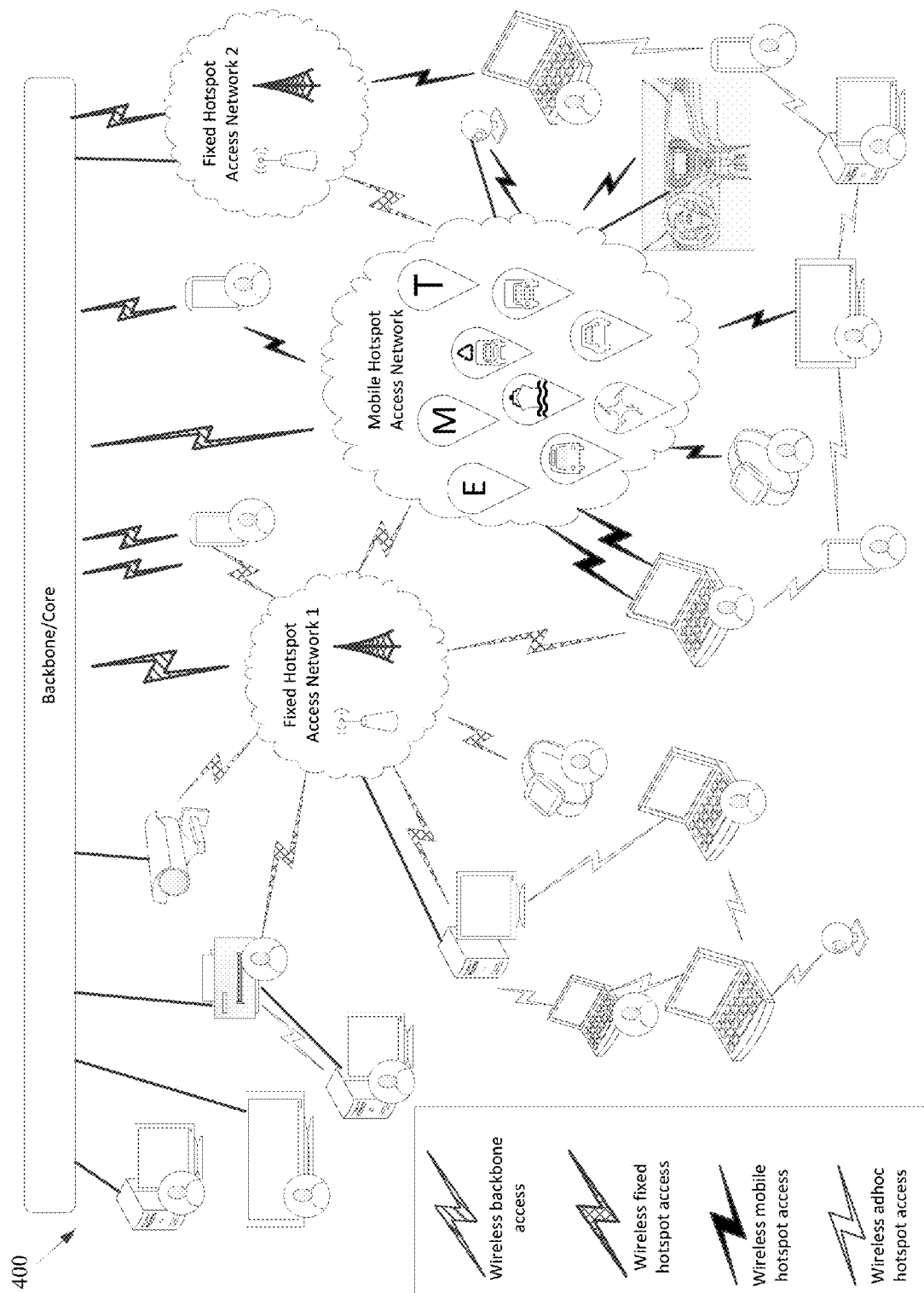
FIG. 4 shows various example end user devices, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5B:
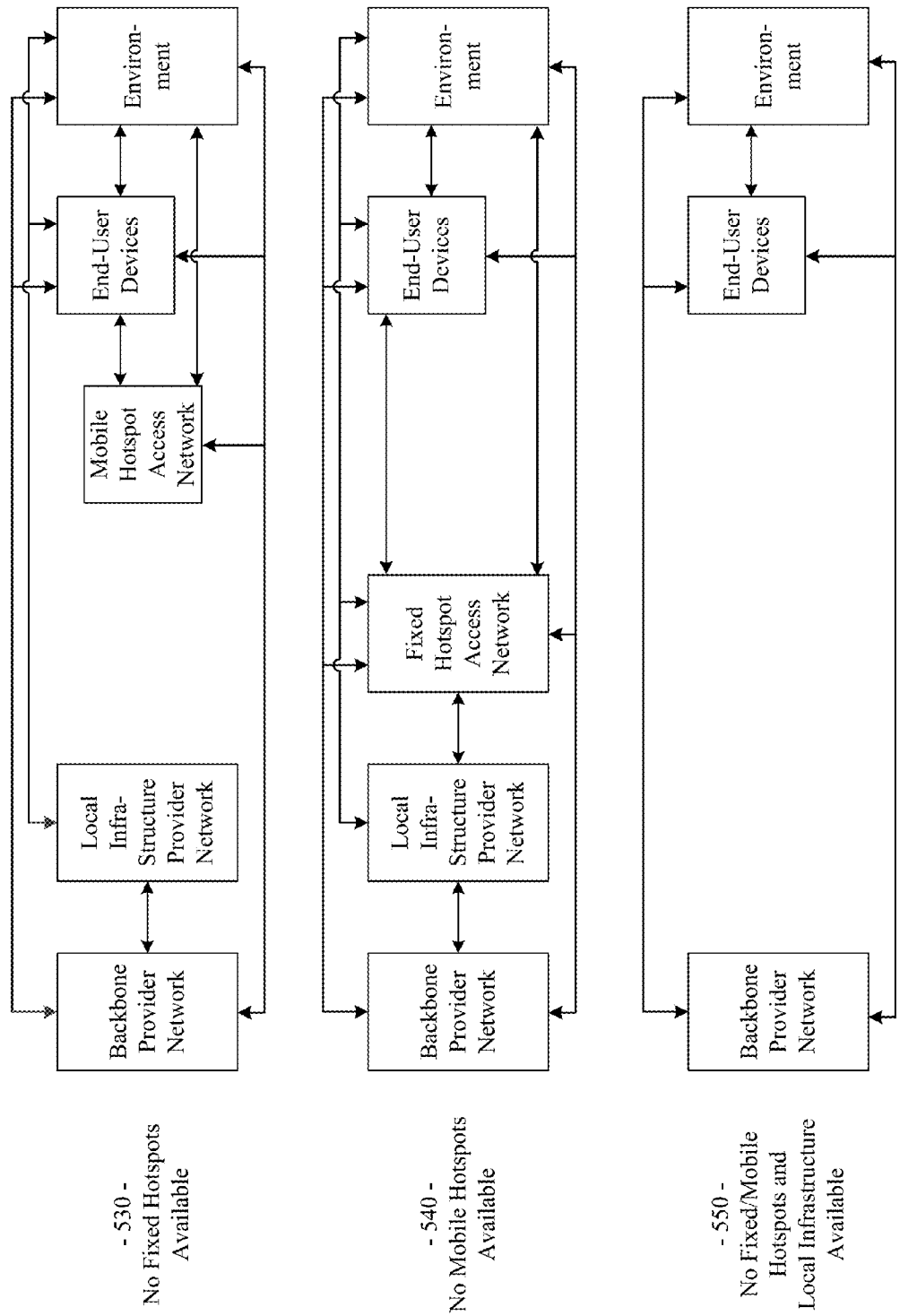
Figure 5C:
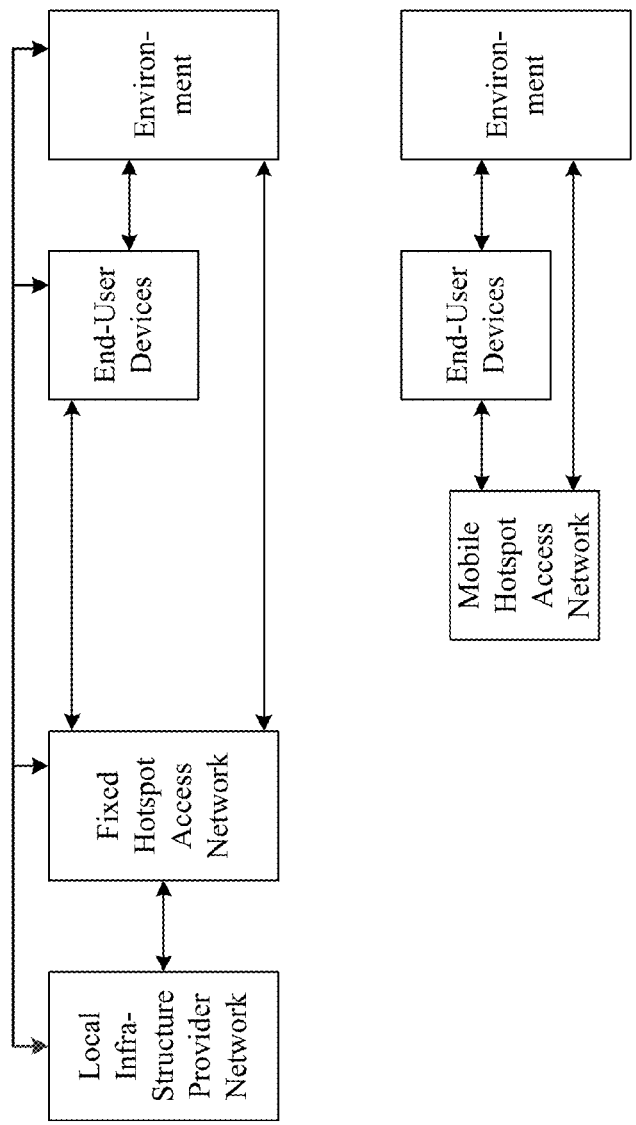

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.).

For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
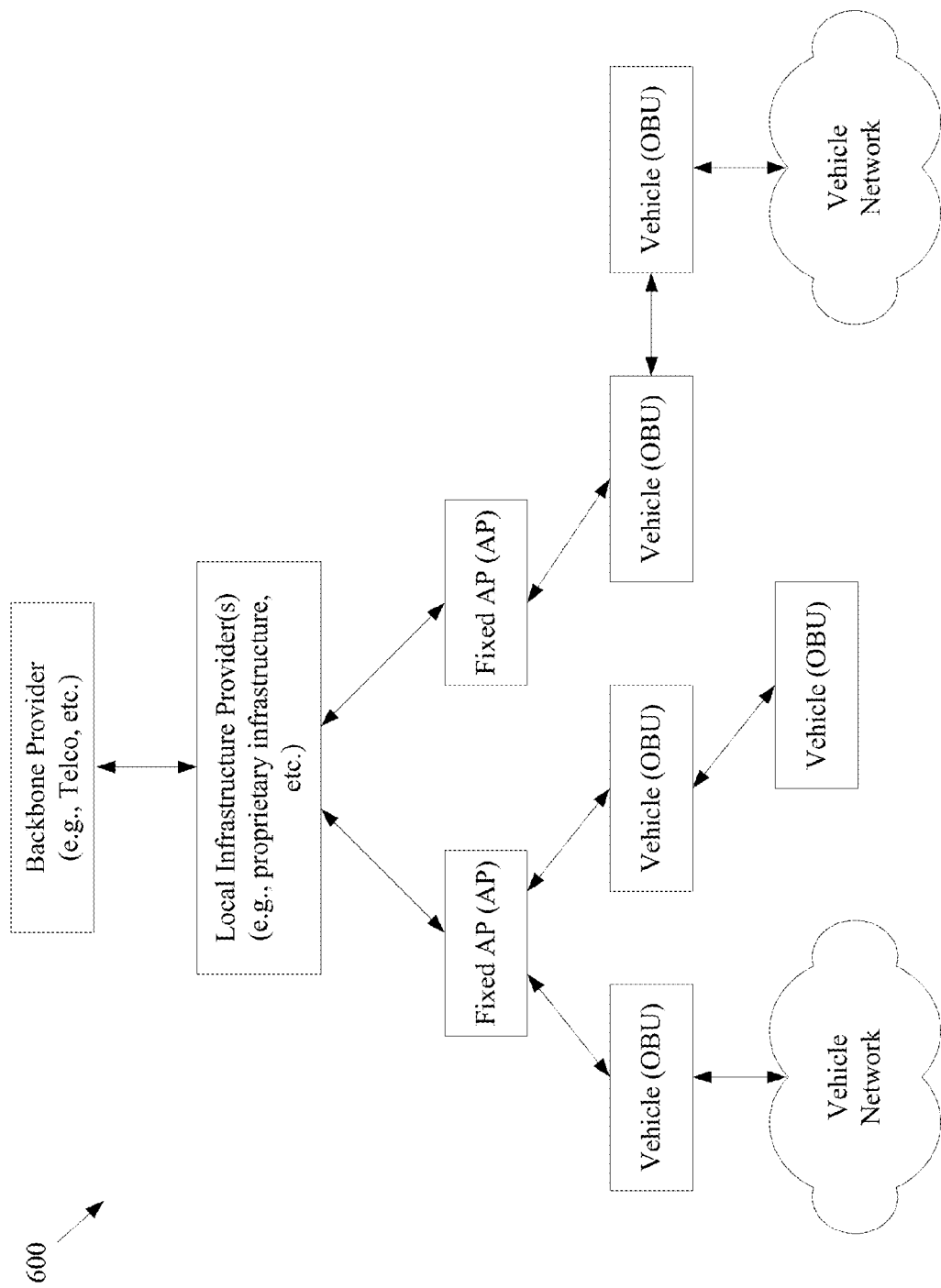
FIG. 6 shows yet another block diagram of an example network configuration, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, and 500-570, discussed herein. Notably, the example network 600 shows a plurality of Mobile APs (or OBUs), each communicatively coupled to a Fixed AP (or RSUs), where each Mobile AP may provide network access to a vehicle network (e.g., comprising other vehicles or vehicle networks, user devices, sensor devices, etc.).

As discussed herein, a network of moving things (e.g., including moving access points, moving sensors, moving user client devices, etc.) may be supported by an infrastructure that comprises a mesh among fixed and mobile APs that can flexibly establish connections with the Internet, the Cloud, private networks, etc.

The functionality of the various fixed and mobile elements of a network of moving things may include software or firmware that is executable by processors, and may include data used by such processors that, for example, control the establishment and management of communication over the various wired and wireless links, communicate data between various elements, enable configuration of various elements according to the use of the network portions, provide services to end users, and perform diagnostics and maintenance of network elements. The software, firmware, and data of the various fixed and mobile elements of a network of moving things may, for example, be in the form of programs, modules, functions, and/or subroutines made of any combination of one or more of machine executable instructions, intermediate language instructions, interpreted pseudocode instructions, and/or higher level or script language instructions. In accordance with the present disclosure, a network of moving things may provide functionality that enables the network to continue to evolve after network deployment, enabling the distribution of updated software, firmware, and/or data that provides new features and enhancements in a curable and reliable manner. In accordance with the present disclosure, such update information for updating software, firmware, and/or data may be referred herein to simply as a software update, an "update," or "update file," and may include digital information representing a configuration of a network entity, software, firmware, and/or the arrangement of the network entities with respect to one another. Such updates may be created to update the software, firmware, and/or data at any granularity including, by way of example and not limitation, at one or more of the program, module, function, and/or subroutine levels. Such updates may be agnostic of the location and expected behavior, and may be totally adaptable to any constraints and requirements desired by the system operator or users.

Figure 7:
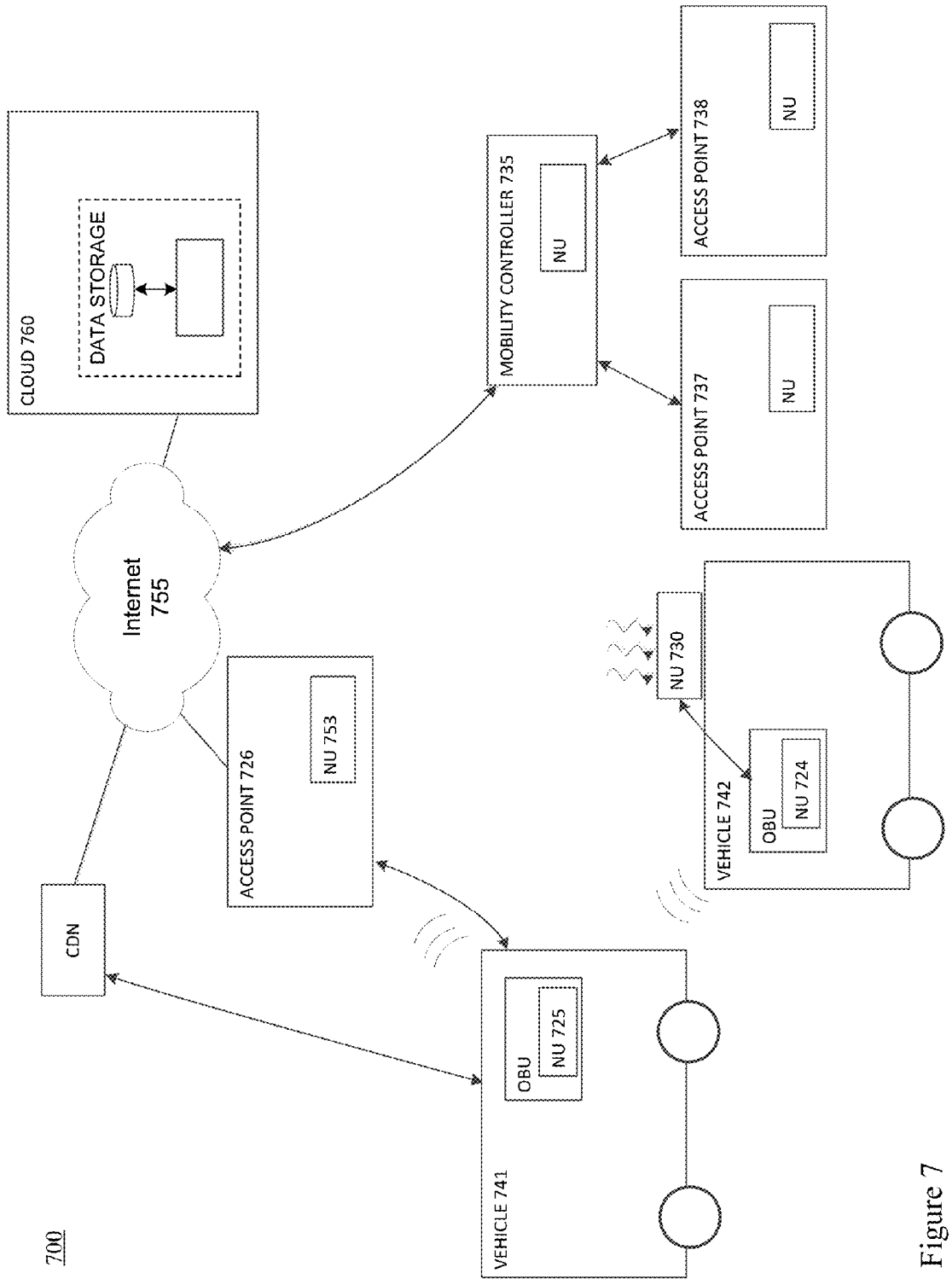
FIG. 7 shows a block diagram of an example communication network, in accordance with various aspects of the present disclosure.

FIG. 7 shows a block diagram of an example communication network 700, in accordance with various aspects of the present disclosure. The example network 700 may, for example, share any or all characteristics with the other example methods, networks, and/or network components 100-600, and 800 discussed herein. As illustrated in FIG. 7, the network 700 includes a number of network components (e.g., cloud 760; vehicles 741, 742; access points 726, 737, 738; and mobility controller 735). The vehicles 741, 742; access points 726, 737, 738; and mobility controller 735 each contain what may be referred to herein as a "network unit" (NU), represented in FIG. 7 as having respective NUs. In the context of a vehicle, the NU may be part of, for example, an OBU, a mobile AP (MAP), and an MC, as previously described above.

In accordance with various aspects of the present disclosure, the mobile NUs may have a number of communication interfaces for various wired and wireless communication protocols, and may have access to a number of communication methodologies including, for example, a "DIRECT" communication methodology that involves direct communication with the destination entity, an "OPPORTUNISTIC" communication methodology that communicates with the destination entity only when one specific communication technology is available (e.g., one of direct short-range communication (DSRC) connectivity to a specific access-point, Bluetooth wireless connectivity, or cellular connectively), and an "EPIDEMIC" communication methodology that may deliver the message to the next available networking neighbor of the entity sending a message. The networking neighbor that is sent the message is then responsible for continuing the delivery of the message to its own neighbor node(s), thereby transporting the message through various network entities until the final destination is reached. In accordance with various aspects of the present disclosure, NUs that are "fixed" rather than "mobile" may be configured to rely on "DIRECT" communication methodologies. Additional details of communication methodologies may be found, for example, in U.S. Provisional Patent Application No. 62/272,750, entitled "Systems and Methods for Remote Software Update and Distribution in a Network of Moving Things," filed Dec. 30, 2015; and U.S. Provisional Patent Application No. 62/278,662, entitled "Systems and Methods for Remote Configuration Update and Distribution in a Network of Moving Things," filed Jan. 14, 2016, the complete subject matter of each of which is hereby incorporated herein by reference, in its respective entirety.

A network of moving things in accordance with various aspects of the present disclosure is able to communicate data with both mobile (e.g., NUs of OBUs/MAPs) and fixed NUs (e.g., in fixed access points (APs)). For example, the mobile NUs 724, 725 in their respective vehicles 742, 741 of FIG. 7 may not have continuous access to or communication with the data storage of cloud 760. In accordance with various aspects of the present disclosure, such mobile NUs may leverage any existing communication connections that are available such as, for example, cellular, DSRC, or other suitable communication technology. In accordance with various aspects of the present disclosure, mobile NUs such as, for example, the NUs 725, 724 of their respective vehicles 741, 742 of FIG. 7 may, for example, communicate with fixed NUs such as, for example, the NUs 753, 737, 738 of FIG. 7, using the EPIDEMIC communication methodology, described above.

In accordance with various aspects of the present disclosure, various sensors (e.g., GNSS/GPS receivers or other sensors connected to NU 730) may not have direct access to or communication with the data storage of the cloud 760, and therefore may leverage the connectivity provided by an NU such as, for example, the "relay" NU 724 of vehicle 742, to which they may connect. Such relay NUs (RNUs) may communicate with any such sensors, in order to enable any such sensors to communicate sensor data with, for example, the cloud 760.

The ever growing volume of information generated by the huge variety of connected devices raises constant challenges in providing reliable transport for that data. Within a few years, with the continued proliferation of the Internet of Things and further deployment of smart sensors, the transportation of the growing volume of data generated by such devices will present a tremendous challenge not only in terms of the amount of bandwidth required, but also with regard to connectivity costs.

A network in accordance with various aspects of the present disclosure, which may be referred to herein as the "Internet of Moving Things" (IoMT), provides a platform that is highly optimized for the transport of data generated by, for example, various sensors in the area served by such a network, in a very scalable way. Additional details regarding interfacing among sensors and a network in accordance with various aspects of the present disclosure may be found, for example, in U.S. Provisional Patent Application No. 62/222,135, entitled "Systems and Methods for Collecting Sensor Data in a Network of Moving Things," filed Sep. 22, 2015. Additional details regarding adapting the granularity, bandwidth, and priority of sensing and disseminating data may be found, for example, in U.S. Provisional Patent Application No. 62/253,249, entitled "Systems and Methods for Optimizing Data Gathering in a Network of Moving Things," filed Nov. 10, 2015. The complete subject matter of each of the above-identified provisional patent applications is hereby incorporated herein by reference, in its respective entirety.

As will be recognized by those of skill in the art, all of the data collected by elements in a network of moving things is potentially valuable for a wide variety of applications and insights, most of which are yet to be discovered. End-to-end data integrity is important in any network, and is particularly so in a network such as the IoMT of the present disclosure, considering the variety of elements and processes involved in its acquisition. At the present time, just a small fraction of the data collected from connected devices is actually being used. However, network support for the collection of high definition data is of increasing importance. A network in accordance with various aspects of the present disclosure provides the foundations for an analytics system that uses collected sensor and other data to provide, for example, optimizations and predictions in a wide variety of different areas (e.g., transportation, environment, and/or communication).

The error in geographic positioning information produced by consumer-grade Global Navigation Satellite System (GNSS) (e.g., GPS) receivers may reach dozens of meters, making them too inaccurate for many applications. While some GNSS receivers such as, for example, those that are equipped to receive Differential GPS (DGPS) signals, are capable of providing higher accuracy geographic positioning information, they are much more expensive, making them unsuitable for deployment in large numbers such as, for example, a large number of access points in a network such as that described above with reference to FIGS. 1-7. It has been observed that within an acceptable radius (e.g., up to 100 kilometers), GNSS (e.g., GPS) positioning errors depend very much on the set of satellites that the receiver is using. Therefore, if two receivers share the same set of visible satellites (i.e., are processing received signals from the same set of satellites in arriving at a positioning solution), the two receivers should experience similar positioning errors. During operation, GNSS/GPS receivers may change the set of satellites used in the calculation of geographic positioning information based on, for example, one or more characteristics of the satellites and the signals received from the satellites. Therefore, the set of satellites used by a GNSS/GPS receiver in the calculation of geographic positioning information is dynamic and constantly changing due to a number of factors.

Accordingly, various aspects of the present disclosure provide for one or more elements of a network of moving things such as, for example, the fixed APs of FIGS. 1-7, to operate as what is referred to herein as a "GNSS anchor" or "GPS anchor. Each such GNSS/GPS anchor may comprise a low cost GNSS/GPS receiver (e.g., one not equipped to provide positioning information using conventional DGPS) that may produce respective geographic position information calculated by the GNSS/GPS receiver from signals received from a particular combination of satellites. The actual geographic position of each GNSS/GPS anchor may be known with great precision by the GNSS/GPS anchor(s) and other network elements, as described further, below. In accordance with various aspects of the present disclosure, in some instances the actual geographic position of a GNSS/GPS anchor may be determined from data produced by a precise land survey, while in other instances the actual geographic position of a GNSS/GPS anchor may be determined using a long-term average of the geographic positioning information produced by the GNSS/GPS receiver of the GNSS/GPS anchor itself and/or information enabling compensation of known biases of the low-cost GPS receiver. In accordance with various aspects of the present disclosure, each such GNSS/GPS anchor may produce a sequence or stream of satellite based positioning information using signals from currently visible GNSS/GPS satellites. Such information may, for example, be used by the anchor, or by other network elements (i.e., one or more MAPs/OBUs, cloud systems) to improve positioning information used by various network elements. For example, according to various aspects of the present disclosure, each GNSS/GPS anchor in the network may use the stream of satellite-based positioning information produced by its own GNSS/GPS receiver and a precisely known geographic location of the GNSS/GPS anchor to calculate a series of respective position error information for each set of satellites used by the GNSS/GPS anchor in calculating a corresponding satellite-based geographic position of the GNSS/GPS anchor. The position error information corresponding to each set of satellites used by the GNSS/GPS anchor (e.g., the set of satellites whose signals are, at a particular point in time, received at a certain minimum level of quality by the GGNSS/GPS receiver of the GNSS/GPS anchor) may then be distributed by the GNSS/GPS anchor to other elements of the network (e.g., located in a vehicle) in the form of what may be referred to herein as one or more "correction vectors." Each such correction vector is therefore representative of a difference between the precisely known geographic position of a corresponding GNSS/GPS anchor and the geographic position calculated using satellite signals currently received by the corresponding GNSS/GPS anchor (i.e., the geographic position of the GNSS/GPS anchor as calculated from satellite signals received by the GNSS/GPS receiver of the GNSS/GPS anchor). In accordance with various aspects of the present disclosure, a correction vector may include, by way of example and not limitation, information representing the position error information discussed above, information identifying the network element that generated the correction vector, and information identifying the set of satellites used by the identified network element to generate the correction vector.

In accordance with various aspects of the present disclosure, a network element having a GNSS/GPS receiver (e.g., one mounted in a vehicle) that is calculating geographic position information using a particular set of GNSS/GPS satellites may apply to the geographic positioning information from its own GNSS/GPS receiver, a correction vector distributed by a GNSS/GPS anchor that is currently producing positioning error information (i.e., one or more correction vectors) based upon the same or a similar set of satellites. In this way, the network element may use its own low-cost GNSS/GPS receiver and one or more correction vectors received from other network element(s) (e.g., one or more fixed APs) to determine its position more accurately than the geographic position determined by the vehicle's GNSS/GPS receiver alone. It should be noted that a network of moving things in accordance with aspects of the present disclosure may have multiple fixed APs, and that each fixed AP may distribute correction vectors to the other elements of the network (e.g., fixed APs, OBUs/MAPs, etc.).

In another example in accordance with various aspects of the present disclosure, a first network element (e.g., one located in a vehicle such as, for example, a MAPs/OBUs) may send to a second network element (e.g., one or more GNSS/GPS anchors or a system of the Cloud), information identifying the satellites currently in view of/in use by the first network element. The second network element (e.g., a GNSS/GPS anchor or system of the Cloud) may then use such satellite identification information from the first network element to, for example, calculate suitable correction vectors and/or other data for the satellites identified as in view of/in use by the first network element, and may provide such correction vectors and/or other data to the first network element for use in producing positioning information of greater accuracy from the positioning information provided by the GNSS/GPS receiver of the first network element. It should be noted that correction vectors distributed by each network element may also be forwarded to neighboring network elements (e.g., fixed APs, OBUs/MAPs) for their use, and for those network elements to also forward to their neighboring network elements, and so on. In this manner, various aspects of this disclosure provide for using low-cost GPS receivers in one or more elements (e.g., fixed APs) of a network such as the network of moving things described above with respect to FIGS. 1-7), to calculate correction vectors, for distributing the correction vectors and/or GNSS/GPS positioning information to be corrected among devices of the network, and for correcting the GNSS/GPS positioning information using the correction vectors. Using a network such as that described above with reference to FIGS. 1-7, corrections to positioning information output by the GNSS/GPS receivers of, for example, vehicles in fleet may be produced using data from GNSS/GPS anchors that are in communication with the fleet vehicles, and may be propagated among the vehicles in near real-time using the fastest and/or most affordable communication interface available to each vehicle of the fleet.

Various aspects of the present disclosure enable the use of multiple, low-cost GNSS/GPS receivers in network elements that serve as GNSS/GPS anchors in a network that may rapidly distribute correction vectors and/or corrected GNSS/GPS positioning information in real-time to users of the network. Aspects of this disclosure enable devices of a network such as, for example, the various elements of the network described above with reference to FIGS. 1-7 (e.g., the OBUs of FIG. 6 and OBUs of vehicles 741, 742 of FIG. 7) to use several such GNSS/GPS anchors (e.g., the fixed APs of FIG. 6 and/or the APs 726, 737, 738 of FIG. 7) spread throughout a geographical area (e.g., a city, a port, a campus, or other region) to obtain performance approaching that of conventional DGPS using low-cost GNSS/GPS receivers. In this way, GNSS/GPS anchors may generate corrections (e.g., correction vectors and/or corrected GNSS/GPS positioning information) and communicate with mobile OBUs in real-time. In accordance with various aspects of the present disclosure, a correction vector may be calculated, may be propagated to a mobile network element having a GNSS/GPS receiver, and may be used to correct positioning information from that GNSS/GPS receiver, all within a matter of milliseconds or a few seconds.

As previously discussed, different GNSS/GPS anchors in a network according to aspects of the present disclosure may use different sets of satellites in calculating a position fix. The quality of the signals received from the "visible" satellites of the GNSS/GPS constellation in use may differ among the GNSS/GPS anchors of such a network. Given the use of low-cost GNSS/GPS receivers in the GNSS/GPS anchors, it may be observed that signals from a relatively small number of GPS satellites may be received with sufficient quality at any particular anchor. Thus, each GNSS/GPS anchor may calculate correction vectors for only a subset of all the satellites that the mobile GPS receivers in the network may be using at any given point in time. Low-latency connectively provided by a network of moving things in accordance with various aspects of the present disclosure, however, enables a mobile device of the network to quickly identify one or more GNSS/GPS anchors that are using or have recently used the same set of satellites, and may use information from the identified anchor(s) to generate corrected GNSS/GPS positioning information in real time (i.e., suitable for use in navigating a vehicle moving at highway speeds).

As discussed above, if an accurate geographic position of a particular GNSS/GPS anchor is known, then correction vectors may be calculated for each combination of satellites from which the particular GNSS/GPS anchor receives signals of sufficient quality. The correction vectors from the particular GNSS/GPS anchor may then be directly applied to the geographic positioning information output by a GNSS/GPS receiver that is using the same set of satellites as the particular GNSS/GPS anchor, but may be located at a different geographic location. In accordance with aspects of the present disclosure, when a GNSS/GPS receiver is within a determined distance proximity of a GNSS/GPS anchor from which it is receiving correction vectors and/or corrected GNSS/GPS positioning information, corrections for additional sources of positioning error may be taken into account (e.g., multi-path errors), and thus additional improvements in positioning accuracy may be achieved. Because multiple GNSS/GPS anchors may be deployed in a network according to the present disclosure (e.g., due to the use of low-cost GNSS/GPS receivers), and because a network such as that disclosed herein enables quick and reliable delivery of correction vectors and/or GPS corrected positioning information to and from any node in the network, a mobile device may identify the closest GNSS/GPS anchor having a desired correction vector and may obtain the correction vector from that GNSS/GPS anchor in real- or near-real time (i.e., sufficiently fast that the corrected positioning information may be used for navigation in/of a vehicle moving at highway speeds).

In accordance with various aspects of the present disclosure, GNSS/GPS anchors, or other network elements, may broadcast/provide correction vectors using the network described above with respect to FIGS. 1-7, or may additionally or alternatively receive and respond to, via the network of moving things, requests for specific correction vectors from specific network elements. Such replies may be sent using, for example, unicast and/or multicast messages carrying the requested correction vectors. This may comprise, for example, sending correction vectors via IEEE 802.11p when vehicles are within direct wireless range of any GNSS/GPS anchor (e.g., via a single or multi-hop connection), and/or via a cellular communication path when out of range of use of IEEE 802.11p.

In accordance with various aspects of the present disclosure, corrections to the positioning information output by a GNSS/GPS receiver of an element of the network (e.g., an OBU of a fleet vehicle) may be made in real-time or near-real-time, such as in the OBU (e.g., MAP) of a vehicle and/or a fixed AP, and/or may be made during post-processing of collected GNSS/GPS data in a system located in the Cloud, for example. In an example implementation, each vehicle OBU may comprise a non-DGPS enabled GNSS/GPS receiver and each GNSS/GPS anchor (e.g., fixed AP) may comprise a similar or different low-cost, non-differential GPS receiver. The OBU of the vehicle and the GNSS/GPS anchor may each have, for example, a communication interface similar to communication interfaces described above with respect to, for example, the OBUs, fixed APs, etc. (e.g., Wi-Fi, IEEE 802.11p, Bluetooth, cellular). In some instances, a GNSS/GPS anchor may determine its own geographic location used to provide a precise correction vector by precisely determining its own geographic location through long term averaging of the positioning information output by its low-cost GNSS/GPS receiver and/or compensation of known biases of its low-cost GNSS/GPS receiver.

In accordance with various aspects of the present disclosure, each GNSS/GPS anchor may periodically broadcast to other network elements, information identifying the set of satellites that the GNSS/GPS anchor is currently using in calculating its own current satellite-based geographic position, as part of or in addition to a correction vector calculated as the difference between a known geographic location of the GNSS/GPS anchor and the geographic location as indicated by the current positioning information output by the GNSS/GPS receiver of the GNSS/GPS anchor. In an example implementation according to aspects of this disclosure, vehicles having OBUs/MAPs with GNSS/GPS receivers and communication interfaces as described herein are operable to receive information broadcast by the GNSS/GPS anchors, and to identify if any GNSS/GPS anchor is using or has recently used the same set of satellites that the GNSS/GPS receiver of the vehicle OBU is using. If so, the position information output by GNSS/GPS of the OBU may be directly corrected by, for example, summing the correction vector from the GNSS/GPS anchor to the geographic positioning information output by the GNSS/GPS receiver of the OBU. In accordance with various aspects of the present disclosure, the GNSS/GPS receiver of, for example, an OBU (e.g., a MAP) may consider a set of satellites to have been "recently" used by a GNSS/GPS anchor if time information sent by the GNSS/GPS anchor with the information identifying the set of satellites (e.g., as part of the correction vector) represents a time that is within a certain a certain window of time prior to the time of receipt by the OBU of the information identifying the set of satellites "recently" used by the GNSS/GPS anchor.

In accordance with various aspects of the present disclosure, one or more elements (e.g., "nodes") of the network (e.g., one or more fixed APs) may operate as what is referred to herein as an "anchor directory node." In accordance with aspects of the present disclosure, the GNSS/GPS anchors of a network as described herein may periodically report their correction vectors to such anchor directory nodes, which may store the correction vector(s), along with any associated information, in a database/table/etc. For example, each correction vector may be stored along with the time of update of the correction vector. In such an implementation, a mobile OBU in need of one or more correction vectors may query one or more of the anchor directory nodes of the network (e.g., the anchor directory node(s) geographically closest to the mobile OBU) to obtain the desired correction vector(s).

It should also be noted that various man-made and natural local features/environment in a geographic region such as, by way of example and not limitation, buildings; bridges; billboards; mountains/hills, tunnels, towers (e.g., power and radio/TV towers), bodies of water, etc., may affect (e.g., attenuate, block, reflect, delay, and/or distort) signals from GNSS/GPS satellites in ways that cause errors/correction vectors to be more dependent on such local features/environment than on the positions of the GNSS/GPS satellites in view/use relative to that geographic region. In certain geographic regions, the information contained in correction vectors and/or related data may depend more on the local environment than on the current positions of satellites in view/use, and such correction vectors in those situations may be referred to herein as "local correction vectors." Local conditions that may give rise to such local correction vectors may be detected by, for example, comparing data from map information for the geographic region against positioning information corrected as described herein. In accordance with various aspects of the present disclosure, the creation of one or more local correction vectors that, when applied to the reported geographic location of, for example, a network element such as a vehicle (e.g., a MAP/OBU), "push" or force the geographic location of that vehicle so as to place that vehicle on a nearest road of the geographic region of the map information may, for example, be used to learn correction vectors that compensate for the local features/environment of that geographic region.

Figure 8:
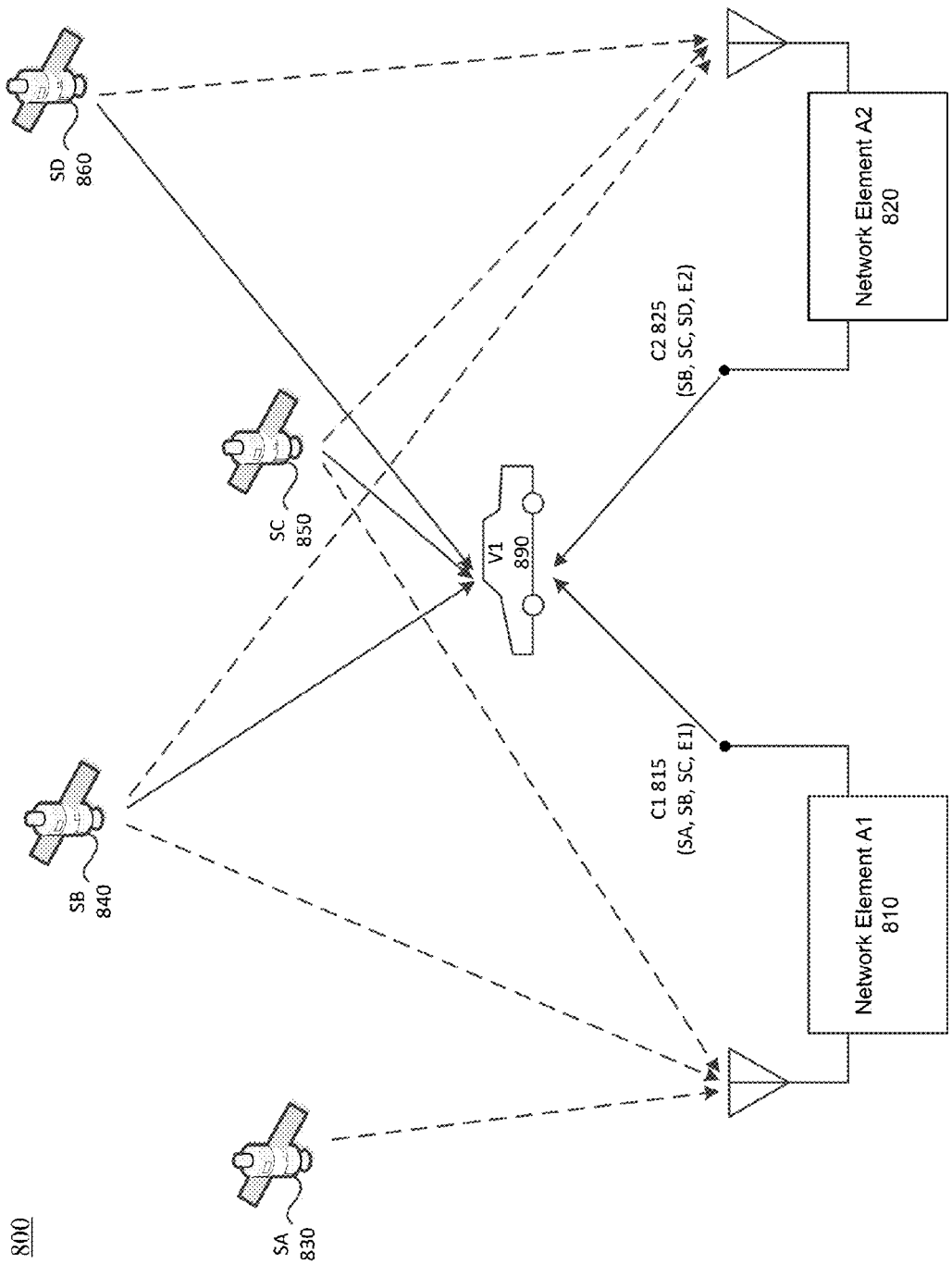
FIG. 8 is a block diagram illustrating the network elements and the information paths involved in the generation of GNSS/GPS correction data using two GNSS/GPS anchors in a network of moving things, in accordance with various aspects of the present disclosure.

FIG. 8 is a block diagram illustrating the network elements and the information paths involved in the generation of GNSS/GPS correction data using two GNSS/GPS anchors in a network of moving things, in accordance with various aspects of the present disclosure. The illustration of FIG. 8 shows four satellites SA 830, SB 840, SC 850, and SD 860 of a space satellite-based geolocation system such as, for example, satellites of the GPS constellation. FIG. 8 also illustrates network elements A1 810 and A2 820 that may be, for example, fixed APs equipped with a GNSS/GPS receiver operable to receive signals from any combination of the four satellites SA 830, SB 840, SC 850, and SD 860, and may act as GNSS/GPS anchors for the illustrated network. Each of the network elements A1 810 and A2 820 are also equipped with a radio frequency communication interface operable to wirelessly communicate with network elements such as, for example, OBUs that may be present in vehicles such as the vehicle V1 890 of FIG. 8. The wireless communication interface of network elements A1 810 and A2 820 may employ, for example, signals compliant with IEEE 802.11p, Wi-Fi, Bluetooth, cellular, or any other suitable air interface. Vehicle V1 890 is similarly equipped to wirelessly communicate directly or indirectly (e.g., via a cellular infrastructure or intermediary network element) with network elements A1 810 and A2 820, and includes an OBU and GNSS/GPS receiver operable to receive signals from any combination of the four satellites SA 830, SB 840, SC 850, and SD 860. In the illustration of FIG. 8, the dashed lines originating at the four satellites SA 830, SB 840, SC 850, and SD 860 represent signals received from those satellites by network elements A1 810 and A2 820, while solid lines originating at the set of satellites SB 840, SC 850, and SD 860 represent satellite signals received by the vehicle V1 890. It should be noted that the illustration of FIG. 8 and the related details discussed herein address the calculation of location information in two-dimensions (i.e., 2D) using signals from a GNSS/GPS system. A similar approach may also be employed by the MAP and/or GNSS/GPS anchor for the calculation of location information in three dimensions (i.e., 3D) using four or more satellites.

In accordance with various aspects of the present disclosure, network element A1 810 (i.e., GNSS/GPS anchor A1 810) may periodically inform, or may respond to requests from elements of the network via correction vector C1 815, regarding the currently calculated error in the positioning information provided by GNSS/GPS receiver of network element A1 810. In the example of FIG. 8, the correction vector C1 815 indicates that network element A1 810 is currently using the set of satellites SA 830, SB 840, and SC 850 in calculating positioning error information E1. In a similar fashion, network element A2 820 (i.e., GNSS/GPS anchor A2 820) may also periodically inform, or may respond to requests from elements of the network via correction vector C2 825, regarding the currently calculated error in the positioning information provided by GNSS/GPS receiver of network element A2 820. In the example of FIG. 8, the correction vector C2 825 indicates that network element A2 820 is currently using the set of satellites SB 840, SC 850, and SC 860 in calculating positioning error information E2. At some point in time, the vehicle V1 890 obtains the correction vectors C1 815 and C2 825; determines that the vehicle V1 890 is currently using satellites SB 840, SC 850, and SD 860, the same satellites as network element A2 820 (i.e., GNSS/GPS anchor A2 820); and selects correction vector C2 825 for use in correcting the geographic positioning information output by the GNSS/GPS receiver of the OBU of the vehicle V1 890. In this manner, highly precise positioning may be obtained using GNSS/GPS anchors employing with low-cost, non-differential GPS enabled receivers, without the use of maps, and without relying on any assumptions regarding the path of a vehicle.

In accordance with some aspects of the present disclosure, a vehicle OBU such as the OBU of vehicle V1 890, or some other element of the network of the present disclosure whose GNSS/GPS receiver is using a set of satellites not shared by any single GNSS/GPS anchor may, for example, collect correction vectors from multiple GNSS/GPS anchors such as those described herein, having at least some satellites in common, and may combine those correction vectors to infer a new correction vector that is applicable to the set of satellites that the vehicle OBU is using.

FIG. 9 shows the information elements of an example correction vector 900, in accordance with various aspects of the present disclosure. The example correction vector 900 of FIG. 9 may correspond to, for example, the correction vectors C1 815 and/or C2 825 shown in FIG. 8. The correction vector 900 of FIG. 9 includes an anchor ID 910 that identifies the network element (e.g., network element A1 810, network element A2 820) that produced the correction vector 900, and an anchor time 912 that represents a time at which the correction vector was produced by the identified anchor. The anchor ID 910 may be, for example, a numeric identifier such as an arbitrary number, an IP address, or a MAC address, or a string identifier such as, for example, an identifying name representing a location, a client, or other unique identifier. The anchor time 912 may, for example, be any suitable time standard or representation (e.g., GMT or GNSS/GPS time).

As shown in FIG. 9, the example correction vector 900 also includes satellite identifier information elements SAT A 914, SAT B 916, SAT C 918, and SAT D 920 that identify the GNSS/GPS satellites used by the identified anchor in producing the correction vector 900. It should be noted that although four satellite identifiers are shown in FIG. 9, the number of satellite identifiers shown in FIG. 9 does not represent a specific limitation of the present disclosure, as a greater or lesser number of satellite identifiers may be used depending on the implementation and operating circumstances.

As also shown in the example of FIG. 9, a correction vector in accordance with various aspects of the present disclosure may include error information elements such as the LAT ERR 922, LON ERR 924, and ALT ERR 926 information elements that may be used to represent, for example, a latitude error, a longitude error, and an altitude error, respectively. The form of representation of the error information produced by the identified anchor may be in the form of a binary, decimal, hexadecimal, or floating point number, as a string of characters, or any other suitable arrangement, without departing from the scope and spirit of the present disclosure.

Figure 10A:
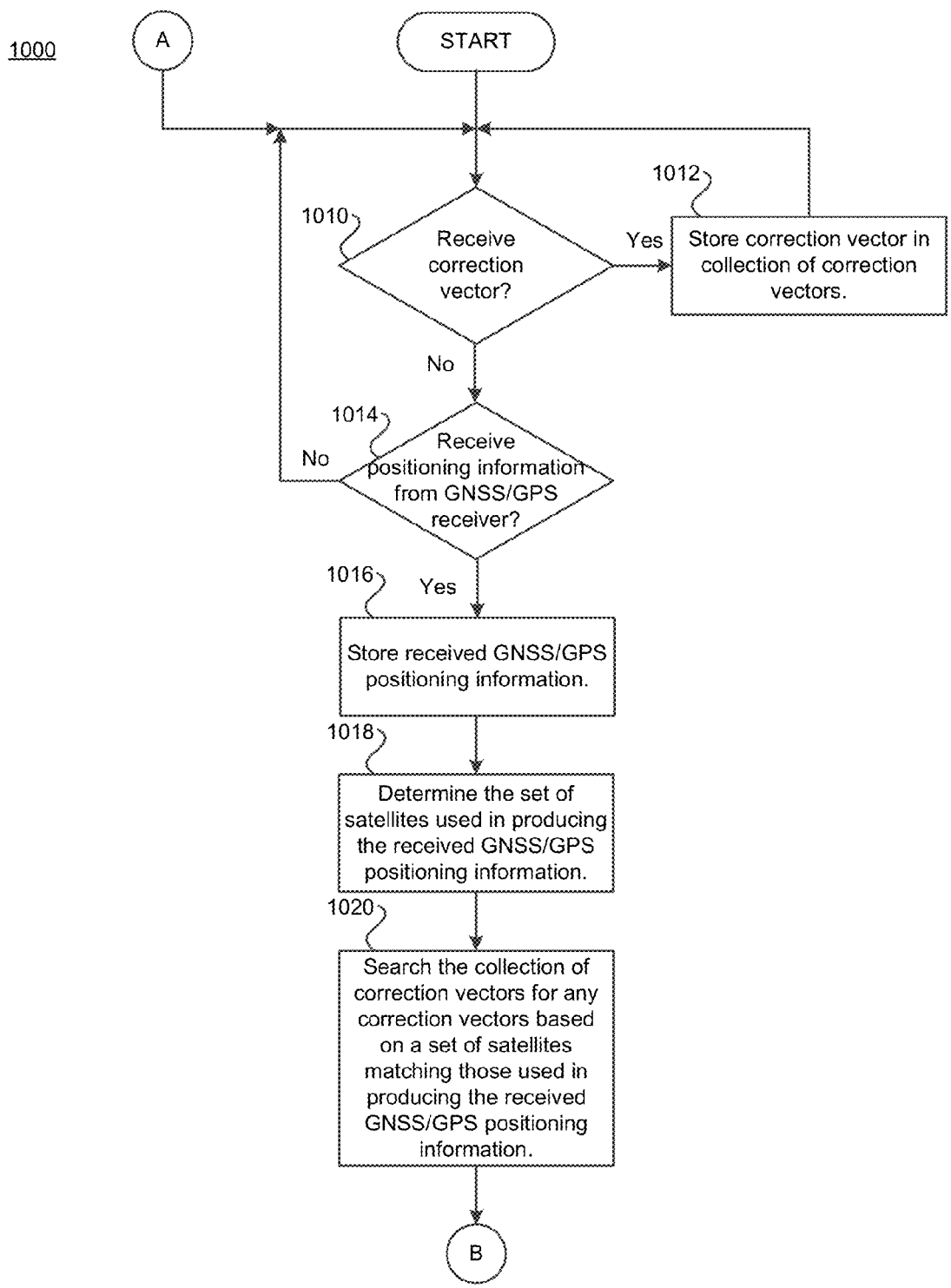
FIGS. 10A-10B illustrate a flowchart of an example method of operating a network element supporting the use of anchors to correct GNSS/GPS data in a network of moving things, in accordance with various aspects of the present disclosure.
Figure 10B:
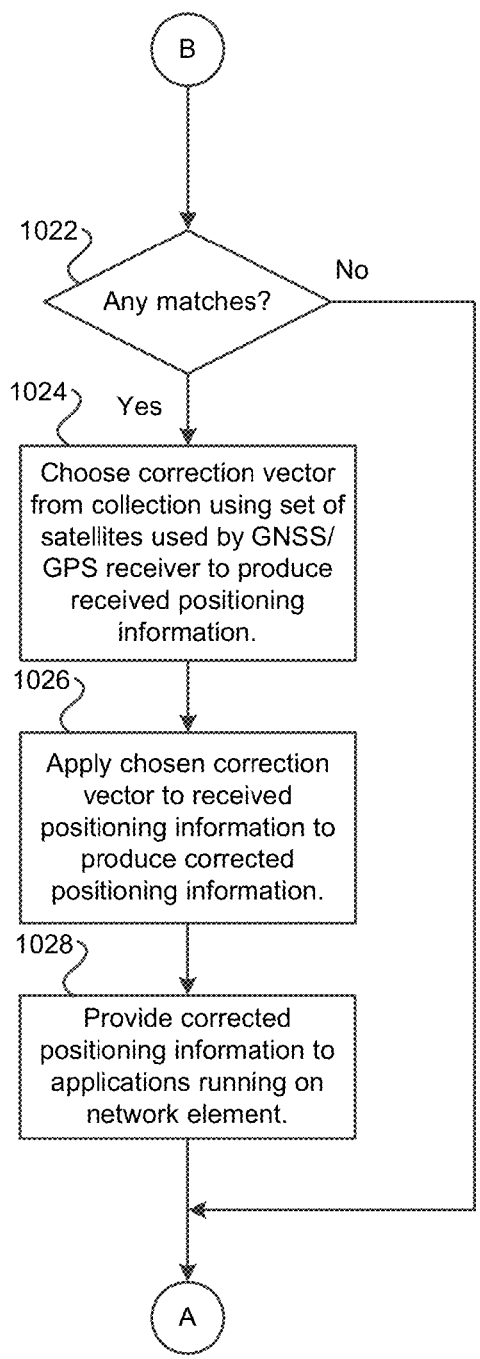

FIGS. 10A-10B illustrate a flowchart 1000 of an example method of operating a network element supporting the use of anchors to correct GNSS/GPS data in a network of moving things, in accordance with various aspects of the present disclosure. The method of FIGS. 10A-10B may be employed in any of the network elements of FIGS. 1-8, discussed above including, for example, the fixed and/or mobile network elements such as a fixed AP, a mobile AP, a mobility controller, an OBU/NU, or any other network element having a use for geographic location information of improved accuracy and equipped with data communication interface(s) for receiving correction vector information generated by anchor elements, and for receiving GNSS/GPS positioning information.

The example method of FIGS. 10A-10B begins at block 1010 of FIG. 10A, at which a network element such as, for example, an NU of a vehicle (e.g., an OBU/NU of vehicles 741, 742 of FIG. 7 and/or vehicle 890 of FIG. 8) determines whether it has received a correction vector produced by a GNSS/GPS anchor (e.g., APs 726, 737, 738 of FIG. 7 and/or network element A1 810 and/or network element A2 820). The correction vector may be received by the NU using, for example, a communication interface compliant with a wireless radio frequency air interface standard such as Wi-Fi, IEEE 8021.11p, Bluetooth, a cellular communication standard, or any other suitable arrangement. If the NU determines that a correction vector has been received, the method of FIG. 10A continues at block 1012, where the NU performing the method is directed to store the received correction vector as part of a collection of correction vectors. The correction vector received and stored by the NU may, for example, employ the format shown in FIG. 9. Once the received correction vector has been stored, the method returns to block 1010, to check for the reception of additional correction vectors.

However, if it is determined, at block 1010, that a correction vector has not been received, the method continues at block 1014, where the NU performing the method determines whether positioning information has been received from a receiver for a GNSS such as, for example, GPS. If no positioning information has been received by the NU of the example, the method returns to block 1010, to continue the activities described above. If, however, positioning information has been received by the NU, the method may direct the NU to, at block 1016, store the received positioning information. Next, at block 1018, the method determines from the received positioning information, the identities of the set of satellites used by the receiver (e.g., a GNSS/GPS receiver) to produce the received positioning information.

Next, at block 1020, the NU performing the method of FIGS. 10A-10B may search the collection of stored correction vectors, looking for any correction vectors that were produced based upon a set of satellites matching the set of satellites used by the source of the received positioning information (e.g., a GNSS/GPS receiver coupled to the NU). Then, at block 1022 of FIG. 10B, the method determines whether any correction vectors have been found that are based on the satellites used for deriving the positioning information. In accordance with various aspects of the present disclosure, a match may be found even if the set of satellites used to produce a correction vector is not an exact match with the set of satellites used in producing/deriving the received positioning information. For example, a correct vector identifying a set of four satellites that are also identified in a set of six satellites used by the receiver that produced the received positioning information, may be considered to be a match. In addition, the search of block 1020 may identify more than one correction vector that lists satellites that match those used by the source of the received positioning information. If no correction vector identifies satellites matching those used by the source of the received positioning information, the method of FIGS. 10A-10B passes control back to block 1010, to continue processing. If at least one match is found, however, processing continues at block 1024.

At block 1024, the method of FIGS. 10A-10B chooses a correction vector from those correction vectors in the collection that were found to match the set of satellites used by the source of the received positioning information. In accordance with various aspects of the present disclosure, the process of choosing a correction vector from two or more matching correction vectors may take into account various parameters including, by way of example and not limitation, the strengths of the signals from each of the satellites in the set of satellites used by the source of the received positioning information, and the relative geographic locations of the anchor(s) that produced the matching correction vector(s) and the geographic location of the source of the received positioning information. The process of choosing a correction vector may also take into account, for example, current ephemeris information for the satellites identified in the correction vector(s) and/or those used to produce the received positioning information, the amount of time elapsed between the generation of the correction vector(s) and the time at which the positioning information was received by the NU, and additional factors.

Next, at block 1026, the method of FIGS. 10A-10B directs the network element (e.g., NU) to apply the information elements of the chosen correction vector(s) to the received positioning information, to produce corrected positioning information of improved accuracy. Then, at block 1028, the method of FIGS. 10A-10B directs the network element to provide the corrected positioning information to any applications, including any neighboring network elements (e.g., NUs of neighboring vehicles, etc.) for their, or their neighbor's use. Control then passes to block 1010, described above.

In accordance with various aspects of the present disclosure, a GNSS/GPS receiver of an OBU of a vehicle (e.g., vehicle V1 890 of FIG. 8), or of another element of the network of the present disclosure, may provide an interface via which the GNSS/GPS receiver can be instructed as to which satellites to use for determining a position solution (e.g., to override the choice of satellites that the GNSS/GPS receiver would otherwise make based on a predetermined selection algorithm such as, for example, one which uses a received signal strength indication (RSSI) of the various satellite signals). In such an implementation, a GNSS/GPS receiver of a vehicle that is close to a particular GNSS/GPS anchor may, for example, be instructed to use the set of satellites being used by the particular GNSS/GPS anchor, in response to analysis of historical data from that GNSS/GPS anchor. For example, the historical data from that GNSS/GPS anchor may indicate a propensity of GNSS/GPS receivers in that geographic location to choose the wrong satellites (e.g., because of interference present at or near the geographic location of the GNSS/GPS anchor).

In accordance with some aspects of the present disclosure, given the large numbers of vehicles that may be in a fleet of vehicles, there may be many different GNSS/GPS receivers that visit particular locations many times, and under many different conditions of the relevant radio frequency environment. Data about the relevant radio frequency environment and GNSS/GPS receiver performance may be collected and analyzed to identify geographic areas and causes of GNSS/GPS errors (e.g., areas where the geographic positioning errors experienced by GNSS/GPS receivers in the vehicles are different than that of the GNSS/GPS receiver(s) of nearby GNSS/GPS anchor(s), despite using the same set of satellites used for determining a geographic position.). In accordance with various aspects of the present disclosure, this type of information may be used in combination with the correction vector(s) from the GNSS/GPS anchor to aid in correcting the positioning information and corrections vectors output by the GNSS/GPS receiver of the GNSS/GPS anchor.

In accordance with various aspects of the present disclosure, the GNSS/GPS receivers used in vehicles and in GNSS/GPS anchors of a network may be operable to measure characteristics of the satellite signals such as, by way of example and not limitation, signal-to-noise ratio, to calculate an estimate of the potential of correction as a function of satellite signal quality. Where there is greater potential for correction, greater resources may be expended to obtain the correction. For example, where the characteristics of received satellite signals indicate that the positioning information output by a GNSS/GPS receiver of an OBU is likely to be accurate enough for current purposes, then the OBU may not choose to receive and/or to apply a correction vector (e.g., to save power, to save cost of data communication (e.g., cellular data usage), etc.). However, where the characteristics of received satellite signals indicate that the positioning information output by the GNSS/GPS receiver of an OBU is not accurate enough for current purposes (e.g., because the current need for positioning information is to supply an application requiring high precision, and/or because the positioning error available is likely to be very bad), then the OBU may choose to expend the resources needed to obtain and apply the correction vector.

The variability of accuracy of geographic positioning information provided by satellite-based positioning techniques is a major issue that affects many businesses including, for example, the transportation of people and goods, national and corporate security, public safety, and a host of other applications. This problem gets worse in large cities with high buildings where GNSS/GPS positioning error are high. Various aspects of the present disclosure improve the accuracy of satellite-based (e.g., GNSS/GPS) location techniques by calculating corrections (e.g., correction vectors) based on positioning information errors at reference locations (i.e., GNSS/GPS anchor stations) whose geographic locations are precisely known, and then applying appropriate corrections to the positioning information output by low-cost, non-differential GPS-enabled receivers residing in network-enabled vehicles. Improving the accuracy of positioning information from satellite-based solutions in this way permits users to, for example, discriminate between events such as when a vehicle is stopped in traffic versus when the vehicle has arrived at its destination. In summary, various aspects of the present disclosure provide communication network architectures, systems, and methods for correcting satellite-based positioning information used in a network of moving things.

Aspects of the present disclosure may be seen in a system using a plurality of anchor nodes to correct positioning information of a plurality of other nodes of a network of moving things. Such a system may comprise a first node of the other nodes, where the first node may comprise a receiver that produces information representative of a geographic location of the first node using signals received from a first set of satellites selected from a constellation of satellites, and an interface for wirelessly communicating with the plurality of anchor nodes and the other nodes. Each of the anchor nodes may provide to the other nodes, via the network, respective correction information identifying a second set of satellites from the constellation and corresponding information representative of error in determining a geographic location of the respective anchor node when using signals from the second set of satellites. The first node may also comprise at least one processor operably coupled to the receiver and the interface. The at least one processor may be operable to, at least, store correction information received from the plurality of anchor nodes to form a collection of correction information; and choose from the collection, correction information having a second set of satellites that matches the first set of satellites. The at least one processor may also be operable to produce corrected information representative of the geographic location of the first node by applying, to the information representative of the geographic location of the first node, the information representative of error in determining the geographic location of the anchor node corresponding to the chosen second set of satellites.

In accordance with various aspects of the present disclosure, the first node may receive the correction information from the corresponding anchor node via a second node of the plurality of other nodes, and the second node may be attached to a moving vehicle. The correction information may comprise information identifying the corresponding anchor node, and may comprise information representative of a time, an error in latitude, and an error in longitude. The information representative of error in determining the geographic location of the anchor node may be calculated based on a geographic location of the first anchor computed as an average of multiple satellite-based geographic location measurements, and the plurality of other nodes may comprise mobile access points and fixed access points. The anchor nodes may provide the correction information to the first node in response to a request from the first node, and the interface may be configured to wirelessly communicate using two or more radio frequency communication standards. The anchor nodes and the other nodes may support multiple communication methodologies comprising a communication methodology that employs only a specific radio frequency communication standard of the two or radio frequency communication standards and a communication methodology that employs any of the two or more radio frequency communication standards.

Further aspects of the present disclosure may be observed in a method of using a plurality of anchor nodes to correct positioning information of a plurality of other nodes of a network of moving things. Such a method may comprise producing information representative of a geographic location of a first node of the other nodes using signals received from a first set of satellites selected from a constellation of satellites; and wirelessly communicating with the plurality of anchor nodes and the other nodes. Each of the anchor nodes may provide to the other nodes, via the network, respective correction information identifying a second set of satellites from the constellation and corresponding information representative of error in determining a geographic location of the respective anchor node when using signals from the second set of satellites. The method may also comprise storing correction information received from the plurality of anchor nodes to form a collection of correction information; choosing from the collection, correction information having a second set of satellites that matches the first set of satellites; and producing corrected information representative of the geographic location of the first node by applying, to the information representative of the geographic location of the first node, the information representative of error in determining the geographic location of the anchor node corresponding to the chosen second set of satellites.

In accordance with the present disclosure, the first node may receive the correction information from the corresponding anchor node via a second node of the plurality of other nodes, and the second node may be attached to a moving vehicle. The correction information may comprise information identifying the corresponding anchor node, and may comprise information representative of a time, an error in latitude, and an error in longitude. The information representative of error in determining the geographic location of the anchor node may be calculated based on a geographic location of the first anchor computed as an average of multiple satellite-based geographic location measurements. The plurality of other nodes may comprise mobile access points and fixed access points, and the anchor nodes may provide the correction information to the first node in response to a request from the first node. The first node may be configured to wirelessly communicate using two or more radio frequency communication standards. The anchor nodes and the other nodes may support multiple communication methodologies comprising a communication methodology that employs only a specific radio frequency communication standard of the two or radio frequency communication standards and a communication methodology that employs any of the two or more radio frequency communication standards.

Additional aspects of the present disclosure may be found in a non-transitory computer-readable medium having stored thereon, a computer program having at least one code section. The at least one code section may be executable by a computer system for causing the computer system to perform operation for using a plurality of anchor nodes to correct positioning information of a plurality of other nodes of a network of moving things, the operations comprising the actions of the method described above.

In summary, various aspects of this disclosure provide systems and methods self-initialization and automated bootstrapping of mobile access points in a network of moving things. As non-limiting examples, various aspects of this disclosure provide systems and methods for adapting fixed access point coverage and/or power input/output in a network of moving things, adapting fixed access point backhaul communication, etc. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A system for an anchor node of a plurality of anchor nodes of a network of moving things, the plurality of anchor nodes used to correct positioning information of a plurality of other nodes of the network, the system comprising:
 a receiver that produces information representative of a current estimated geographic location of the anchor node calculated using signals received from a corresponding first set of satellites selected from a constellation of satellites;
 reference geographic location information for the anchor node;
 an interface configured to wirelessly communicate with the plurality of other nodes; and
 at least one processor operably coupled to the receiver, the reference geographic location information of the anchor node, and the interface, the at least one processor operable to, at least:
 calculate positioning error information for the anchor node corresponding to the first set of satellites, using the information representative of a current estimated geographic location of the anchor node and the reference geographic location information for the anchor node,
 transmit correction information to the plurality of other nodes, the correction information comprising a representation of the positioning error information and information identifying the first set of satellites, and
 wherein the correction information enables a particular node of the plurality of other nodes that receives the correction information to:
 add the correction information received from the anchor node to a collection of correction information, and
 generate a corrected geographic location of the particular node by applying, to a current estimated geographic location of the particular node calculated using signals received from a second set of satellites selected from the constellation of satellites, positioning error information corresponding to the second set of satellites chosen from the collection of correction information.

2. The system according to claim 1, wherein the anchor node transmits the correction information to the particular node via a second node of the plurality of other nodes.

3. The system according to claim 1, wherein the particular node is attached to a moving vehicle.

4. The system according to claim 1, wherein the correction information transmitted by the anchor node comprises information identifying the anchor node.

5. The system according to claim 1, wherein the correction information transmitted by the anchor node comprises information representative of a time, an error in latitude, and an error in longitude.

6. The system according to claim 1, wherein the reference geographic location information for the anchor node is calculated as an average of multiple satellite-based geographic location measurements.

7. The system according to claim 1, wherein the plurality of other nodes comprises mobile access points and fixed access points.

8. The system according to claim 1, wherein the anchor node provides the correction information to the particular node in response to a request from the particular node.

9. The system according to claim 1, wherein the interface is configured to wirelessly communicate using two or more radio frequency communication standards, and wherein the plurality of anchor nodes and the plurality of other nodes support multiple communication methodologies comprising a communication methodology that employs only a specific radio frequency communication standard of the two or more radio frequency communication standards and a communication methodology that employs any of the two or more radio frequency communication standards.

10. A method for operating an anchor node of a plurality of anchor nodes of a network of moving things, the plurality of anchor nodes used to correct positioning information of a plurality of other nodes of the network, the method comprising:
producing information representative of a current estimated geographic location of the anchor node calculated using signals received from a corresponding first set of satellites selected from a constellation of satellites;
wirelessly communicating with the plurality of other nodes;
calculating positioning error information for the anchor node corresponding to the first set of satellites, using the information representative of a current estimated geographic location of the anchor node and reference geographic location information for the anchor node;
transmitting correction information to the plurality of other nodes, the correction information comprising a representation of the positioning error information and information identifying the first set of satellites; and
wherein the correction information enables a particular node of the plurality of other nodes that receives the correction information to:
add the correction information received from the anchor node to a collection of correction information, and
generate a corrected geographic location of the particular node by applying, to a current estimated geographic location of the particular node calculated using signals received from a second set of satellites selected from the constellation of satellites, positioning error information corresponding to the second set of satellites chosen from the collection of correction information.

11. The method according to claim 10, wherein the anchor node transmits the correction information to the particular node via a second node of the plurality of other nodes.

12. The method according to claim 10, wherein the particular node is attached to a moving vehicle.

13. The method according to claim 10, wherein the correction information transmitted by the anchor node comprises information identifying the anchor node.

14. The method according to claim 10, wherein the correction information transmitted by the anchor node comprises information representative of a time, an error in latitude, and an error in longitude.

15. The method according to claim 10, wherein the reference geographic location information for the anchor node is calculated as an average of multiple satellite-based geographic location measurements.

16. The method according to claim 10, wherein the plurality of other nodes comprises mobile access points and fixed access points.

17. The method according to claim 10, wherein the anchor node provides the correction information to the particular node in response to a request from the particular node.

18. The method according to claim 10, wherein the interface is configured to wirelessly communicate using two or more radio frequency communication standards, and wherein the plurality of anchor nodes and the plurality of other nodes support multiple communication methodologies comprising a communication methodology that employs only a specific radio frequency communication standard of the two or more radio frequency communication standards and a communication methodology that employs any of the two or more radio frequency communication standards.

19. A non-transitory computer-readable medium having stored thereon a plurality of codes sections, each code section comprising a plurality of instructions executable by a processor to cause the processor to perform the actions of a method for operating an anchor node of a plurality of anchor nodes of a network of moving things, the plurality of anchor nodes used to correct positioning information of a plurality of other nodes of the network, the steps of the method comprising:
producing information representative of a current estimated geographic location of the anchor node calculated using signals received from a corresponding first set of satellites selected from a constellation of satellites;
wirelessly communicating with the plurality of other nodes;
calculating positioning error information for the anchor node corresponding to the first set of satellites, using the information representative of a current estimated geographic location of the anchor node and reference geographic location information for the anchor node;
transmitting correction information to the plurality of other nodes, the correction information comprising a representation of the positioning error information and information identifying the first set of satellites; and
wherein the correction information enables a particular node of the plurality of other nodes that receives the correction information to:
add the correction information received from the anchor node to a collection of correction information, and
generate a corrected geographic location of the particular node by applying, to a current estimated geographic location of the particular node calculated using signals received from a second set of satellites selected from the constellation of satellites, positioning error information corresponding to the second set of satellites chosen from the collection of correction information.

20. The non-transitory computer-readable medium according to claim 19, wherein the anchor node transmits the correction information to the particular node via a second node of the plurality of other nodes.

21. The non-transitory computer-readable medium according to claim 19, wherein the particular node is attached to a moving vehicle.

22. The non-transitory computer-readable medium according to claim 19, wherein the correction information transmitted by the anchor node comprises information identifying the anchor node.

23. The non-transitory computer-readable medium according to claim 19, wherein the correction information transmitted by the anchor node comprises information representative of a time, an error in latitude, and an error in longitude.

24. The non-transitory computer-readable medium according to claim 19, wherein the reference geographic location information for the anchor node is calculated as an average of multiple satellite-based geographic location measurements.

25. The non-transitory computer-readable medium according to claim 19, wherein the plurality of other nodes comprises mobile access points and fixed access points.

26. The non-transitory computer-readable medium according to claim 19, wherein the anchor node provides the correction information to the particular node in response to a request from the particular node.

27. The non-transitory computer-readable medium according to claim 19, wherein the interface is configured to wirelessly communicate using two or more radio frequency communication standards, and wherein the plurality of anchor nodes and the plurality of other nodes support multiple communication methodologies comprising a communication methodology that employs only a specific radio frequency communication standard of the two or more radio frequency communication standards and a communication methodology that employs any of the two or more radio frequency communication standards.

* * * * *